United States Patent
Seagle et al.

(10) Patent No.: US 6,798,616 B1
(45) Date of Patent: Sep. 28, 2004

(54) WRITE HEAD ARCHITECTURE FOR IMPROVED MANUFACTURABILITY

(75) Inventors: David J. Seagle, Morgan Hill, CA (US); Qing He, Fremont, CA (US); Lien-Chang Wang, Fremont, CA (US); Ming Zhao, Fremont, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 421 days.

(21) Appl. No.: 09/902,873

(22) Filed: Jul. 10, 2001

(51) Int. Cl.[7] .............................. G11B 5/39; G11B 5/42
(52) U.S. Cl. ....................................................... 360/126
(58) Field of Search ................................ 360/124, 125, 360/126, 127, 317; 29/603.13, 603.14, 603.15, 603.16, 603.09

(56) References Cited

U.S. PATENT DOCUMENTS

| | | | | |
|---|---|---|---|---|
| 4,589,042 A | * | 5/1986 | Anderson et al. | 360/125 |
| 5,134,535 A | * | 7/1992 | Mallary | 360/126 |
| 5,245,493 A | * | 9/1993 | Kawabe et al. | 360/126 |
| 5,600,519 A | * | 2/1997 | Heim et al. | 360/126 |
| 5,801,910 A | * | 9/1998 | Mallary | 360/126 |
| 5,805,391 A | * | 9/1998 | Chang et al. | 360/317 |
| 5,867,890 A | * | 2/1999 | Hsiao et al. | 29/603.14 |
| 5,995,343 A | * | 11/1999 | Imamura | 360/126 |
| 6,172,848 B1 | * | 1/2001 | Santini | 360/126 |
| 6,274,256 B1 | * | 8/2001 | Watanabe et al. | 428/692 |
| 6,282,776 B1 | * | 9/2001 | Otsuka et al. | 29/603.14 |
| 6,288,871 B1 | * | 9/2001 | Tanabe | 360/126 |
| 6,327,116 B1 | * | 12/2001 | Watanabe et al. | 360/126 |
| 6,330,127 B1 | * | 12/2001 | Sasaki | |
| 6,373,657 B1 | * | 4/2002 | Kamijima | 360/126 |
| 6,381,093 B2 | * | 4/2002 | Yoshida et al. | 360/126 |
| 6,480,355 B1 | * | 11/2002 | Kamijima | 360/126 |
| 6,525,904 B1 | * | 2/2003 | Sasaki | 360/126 |

* cited by examiner

*Primary Examiner*—George J. Letscher
*Assistant Examiner*—Christopher R Magee
(74) *Attorney, Agent, or Firm*—Stetina, Brunda, Garred & Brucker (57) ABSTRACT

A disk drive write head having in consecutive layers a bottom pole, a write gap layer, a first insulation layer, a coil, a second insulation layer having an insulation layer boundary, and a top pole on the second insulation layer. The top pole includes a main body portion and a nose portion and has a flare line at the location where the nose portion expands to become the main body portion. The top pole further includes a curved contour portion having a contour boundary, a tip which terminates in an air bearing surface, and a flat portion on the top surface of the nose extending between the tip and the contour boundary. The insulation layer boundary is recessed from the air bearing surface such that the top pole contour boundary lies substantially close to the flare line, thus producing a top pole top surface which is substantially flat.

20 Claims, 6 Drawing Sheets

WRITE HEAD ARCHITECTURE FOR IMPROVED MANUFACTURABILITY

TECHNICAL FIELD

The present invention relates generally to inductive write heads used in magnetic media storage devices, and more particularly to magneto-resistive disk drive heads.

BACKGROUND ART

A computer disk drive stores and retrieves data by positioning a magnetic read/write head over a rotating magnetic data storage disk. The head, or heads, which are typically arranged in stacks, read from or write data to concentric data tracks defined on the surface of the disks which are also typically arranged in stacks. The heads are included in structures called "sliders" into which the read/write sensors are imbedded during fabrication. The goal in recent years is to increase the amount of data that can be stored on each hard disk. If data tracks can be made narrower, more tracks will fit on a disk surface, and more data can be stored on a given disk. The width of the tracks depends on the width of the read/write head used, and in recent years, track widths have decreased as the size of read/write heads have become progressively smaller. This decrease in track width has allowed for dramatic increases in the recording density and data storage of disks.

In a magneto-resistive (MR) sensor changes in the strength and orientation of magnetic fluxes are sensed as changes in electric resistance, as an MR read head encounters changes in magnetic data, as on a computer hard drive. In such an MR sensor, the read head operates based on the anisotropic magneto-resistance (AMR) effect in which the resistance of the read element varies in proportion to the square of the cosine of the angle between the magnetization and the direction of sense current flowing through the sensor. This effect is relatively weak in magnitude, and consequently more attention has been paid in recent years to what is referred to as "spin valve (SV) effect" or "giant magneto-resistance (GMR) effect" because of its relatively large magnitude of effect.

In this type of MR sensor, the resistance of a layered magnetic sensor varies due to both spin-depending transfer of conduction electrons between magnetic layers (M1, M2) via a non-magnetic layer (N), and spin-depending scattering at the interfaces between the layers accompanying the transfer of conduction electrons. The in-plane resistance between the pair of ferromagnetic layers (M1, M2), separated by a non-magnetic layer (N), varies in proportion to the cosine of the angle between the magnetization in the two ferromagnetic layers.

In ferromagnetic materials, scattering of electrons depends on the spin on the carriers. Resistivity is proportional to the scattering of electrons. Electrons with A spins parallel to the magnetization direction experience very little scattering and hence provide a low-resistance path. If magnetization of one side of this triple layer (M2) is pinned and M1 is gradually rotated from a parallel to an anti-parallel direction, the resistance of the structure increases in proportion to the cosine of the angle of magnetizations of the two layers M1, and M2. The spin valve is sensitive at low fields because the ferromagnetic layers are uncoupled, therefore a small magnetic field from the magnetic media can rotate the magnetization in one layer relative to the other.

A constant current passes through the sensing region from one electrode terminal (not shown) to another electrode terminal. The total electric resistance of the spin valve changes in proportion to a cosine of an angle between the magnetization direction of the pinned magnetic layer (M2) and the magnetization direction of the free magnetic layer (M1). When the total electric resistance is changed, a voltage difference between the electrode terminals changes and is sensed as read information.

Figure 4:
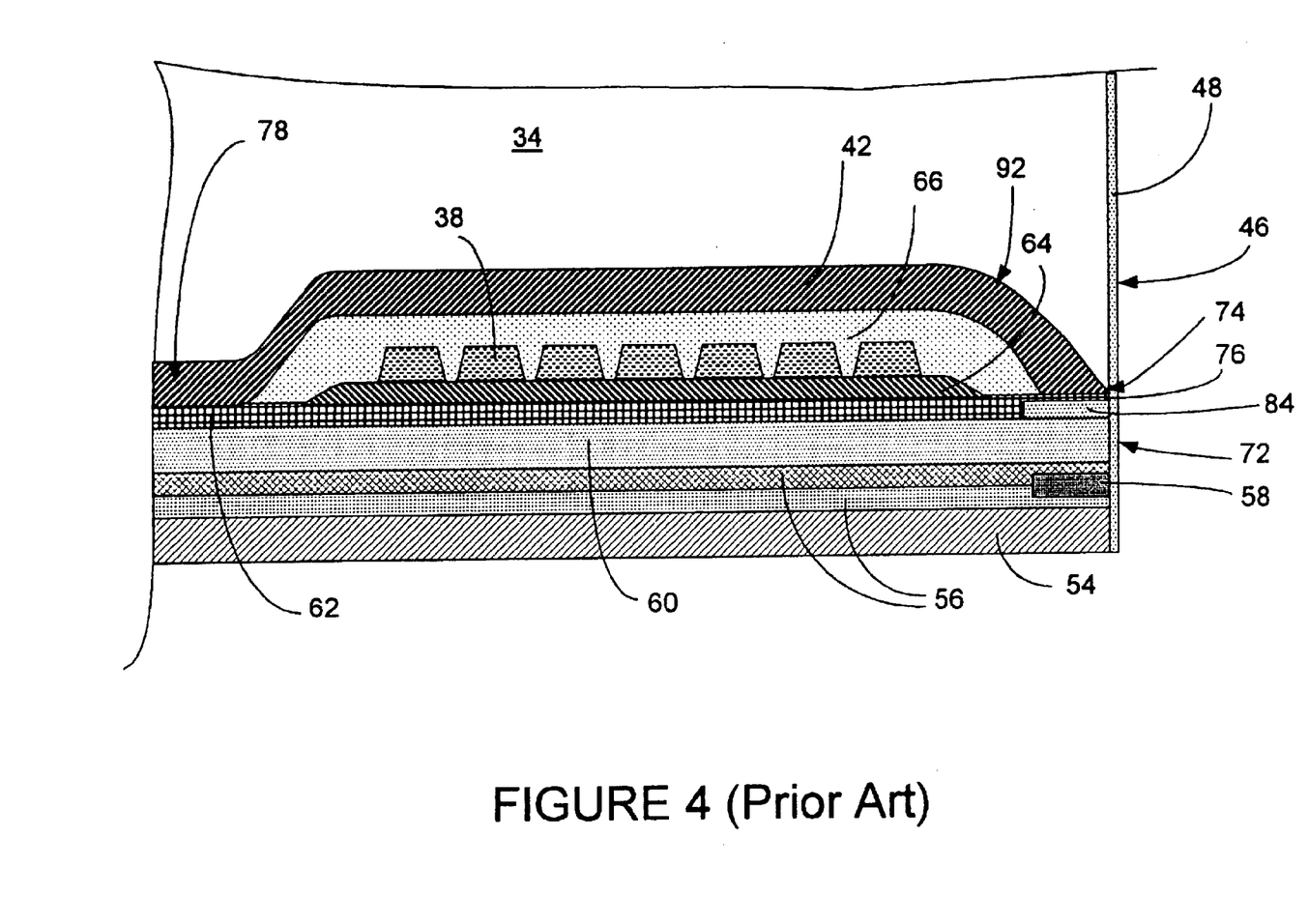
FIG. 4 shows a partial cross sectional view from line 4—4 of FIG. 3, which has been turned to a horizontal orientation, of the magneto-resistive read/write head, showing the standard features used in the prior art.

This type of head for writing data is generally configured with two poles separated by a gap layer of non-magnetic material. A typical prior art read/write head is shown in FIG. 4. Layers are generally deposited upon one another and typically include a shield layer 54, a dual gap layer 56, which surround a Magneto-resistive sensor, called MR sensor 58, a pole piece layer, which will be referred to as the bottom pole or P1 60, a non-magnetic gap layer 62, a first insulation layer or I1 64, upon which the coils 38 lie, and a second insulation layer, usually referred to as I2 66, which is generally made from photo-resist material. The top pole 42 is next, and is also commonly referred to as P2. The bottom and top poles 60, 42 each have bottom and top pole tips 72, 74 respectively with pole write gap 76 between them. The Air Bearing Surface ABS 46 and the coating layer 48 are also shown, as well as a back gap 78. The top and bottom poles 42, 60 typically extend from the ABS 46 in a roughly parallel manner until the top pole 42 veers upward to accommodate the thickness of the coils 38 and insulation layers I1 64 and I2 66. The bottom pole 60 may also include an extension portion called a pedestal 84.

Figure 3:
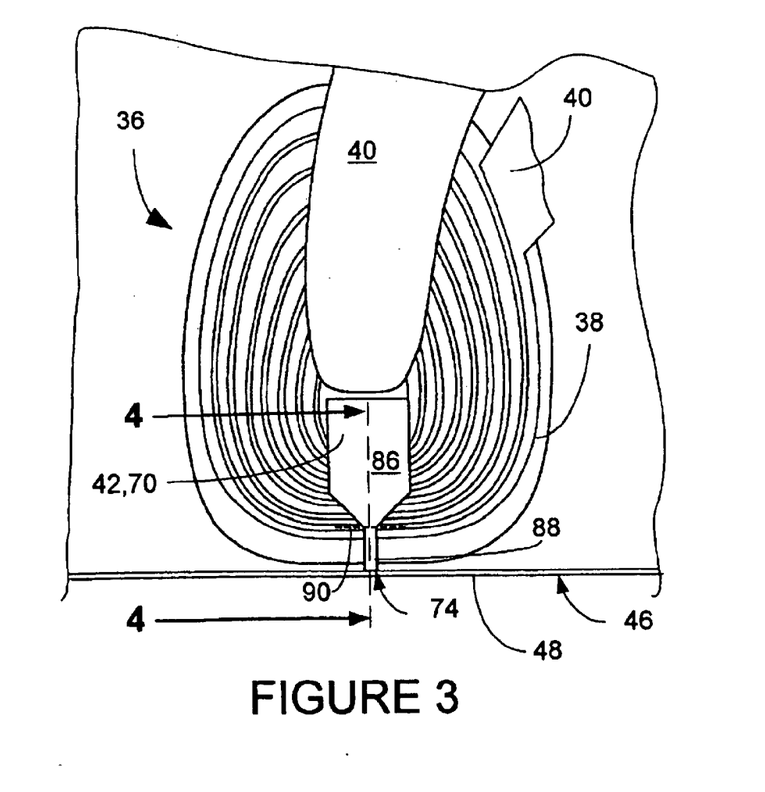
FIG. 3 illustrates a top plan view of a magneto-resistive read/write head.

There are other features which are only apparent from a top or isometric view of the write head. As seen in FIG. 3, the top pole 42 has a main body portion 86 and a narrower portion, commonly referred to as a pole tip or nose 88. The narrow dimension of the top and bottom poles 42, 60 at the write gap 76 determine the track width and also serve to channel the magnetic flux to increase the flux density across the write gap 76. The point at which the nose begins to widen is known as the flare line 90. This is shown in prior art FIGS. 5B, 6B and 8A and B.

Figure 5A:
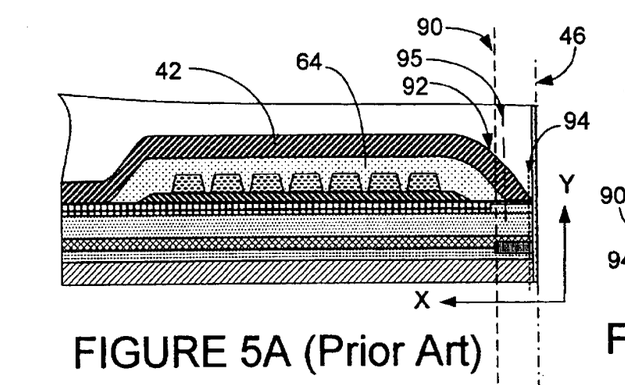
FIG. 5A illustrates a partial cross sectional view from line 4—4 of FIG. 3, which has been turned to a horizontal orientation, of a magneto-resistive read/write head of the prior art.
Figure 5B:
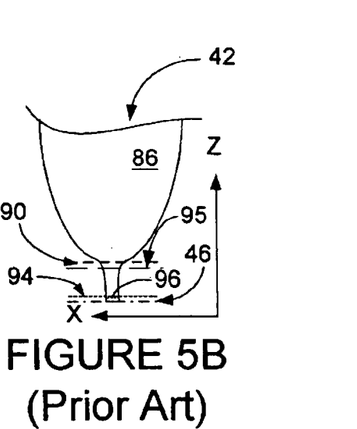
FIG. 5B shows a simplified partial top plan view of a top pole P2 of the prior art.
Figure 6A:
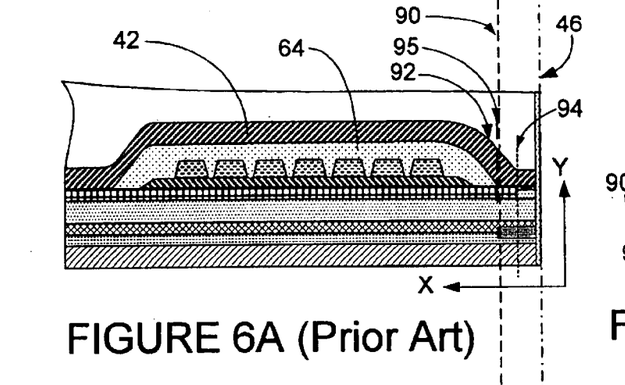
FIG. 6A illustrates a partial cross sectional view from line 4—4 of FIG. 3, which has been turned to a horizontal orientation, of a magneto-resistive read/write head of the prior art.
Figure 6B:
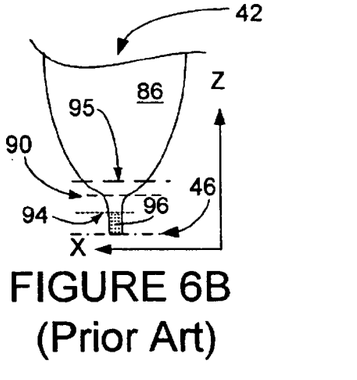
FIG. 6B shows a simplified partial top plan view of a top pole P2 of the prior art.
Figure 8A:
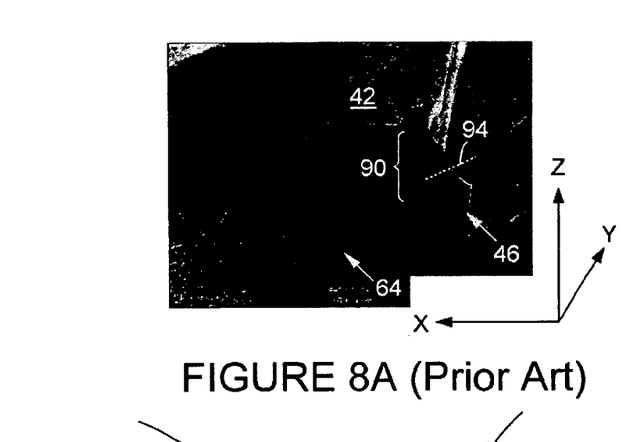
FIG. 8A shows a scanning electron microscope isometric view of the end portion of a write head of the prior art.
Figure 8B:
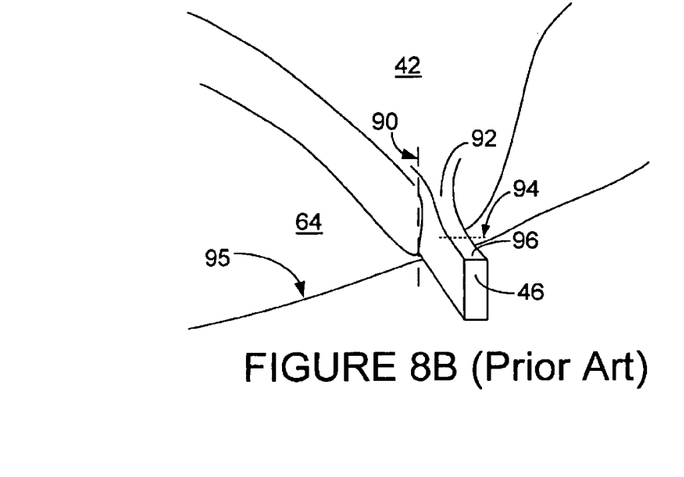
FIG. 8B is a simplified line drawing of the same end portion of a write head of the prior art.

The write head is a complex shape in 3 dimensions which cannot be understood by only one view. As seen from the cross-sections 5A and 6A, axes are shown for the x and y directions as the z axis is normal to the plane of the paper in these views. In this view, the top pole P2 42 has a flat portion covering the main portion of the coils 38, which then begins to curve as the pole approaches the ABS 46 so that the distance between the top pole 42 and the bottom pole P1 60 narrows. This curved contour portion 92 has a contour boundary 94, at which point the top pole 42 typically includes a flat portion 96 as it approaches the top pole tip 74 (see FIG. 4). FIGS. 5A and B and 6A and B are corresponding cross-sectional and top plan views of two prior art write head architectures. FIGS. 5B and 6B are top plan views similar to FIG. 3 of the top pole P2 42, and includes axes x and z, the y axis being normal to the plane of the page. As the top pole curved contour 92 curves in the x and y dimensions, the flare 90 widens in the x and z dimensions. FIG. 8A shows an isometric view of the prior art write head 42 with the three axes indicated for reference.

When the flare line 90 of the head lies within the contour boundary 94, then a portion of the pole nose 88 is also curved, or to put it another way, the contour boundary 94 lies closer to the ABS 46 than the flare point 90. Thus the flat portion 96 of the pole nose 88 is small, as seen in FIG. 6B and 8A and B, or practically non-existent as in FIG. 5B.

There are several difficulties in manufacturing write heads such as the ones shown in FIGS. 5A–B, 6A–B and 8A and B. The performance of a write head in many ways is related to how close the flair position can be located to the air bearing surface. The closer it is, the more high performance media that can be written, and the smaller the track width that can be written. The problem in the manufacturing process is to control the structure and the position of the flare. It is much easier to control the fabrication of a structure when it is on a flat surface than it is on a curved surface. This process typically involves photo-lithography, and when light comes down onto a sloped surface, it tends to reflect and scatter out. In contrast, when light comes onto a flat surface, it has a tendency to reflect off the bottom and come back up rather than scattering out. This makes it easier to control the dimensions from a photo-lithography standpoint when the process is performed on a flat surface. Thus, the larger the portion of the pole nose 88 that is flat, the greater control in manufacturing, the better the performance of the head and the greater the ease of manufacture there is.

In addition, in the manufacturing process, air pockets or voids are often inadvertently created thanks to a process known as "mushrooming". As discussed below, these air pockets are a concern when they are formed very close to the air bearing surface ABS, as they can serve as sites for corrosion, and can interfere with the operation of the write head. Thus it is desired that any air pockets which are formed are recessed from the ABS. A write head having the I2 insulation layer close to the ABS would be expected to have air pocket formations closer to the ABS than one which is also recessed from the ABS. If the boundary of the I2 insulation layer is recessed from the ABS, the area of mushrooming will also be recessed, and thus air pockets or voids will necessarily be formed farther from the ABS as well. The write head performance will therefore be improved.

Another concern in fabrication of write heads occurs during the lapping process. The ABS is lapped, which involves removing a small amount of material from the front of the nose. The track width that is written by the head depends on the width of the nose portion at the ABS. The depth, of lapping can vary slightly due to minute variations in processing, and in the fabrication of the top pole. A variation in lapping depth will expose different cross-sections of the nose, so in order to maintain the track width as closely as possible, it is desired that cross-sections will yield the same dimensions as nearly as possible throughout the length of the nose portion or at least the front part of the nose which may be involved in the lapping process. Thus a rectangular cross-section which is uniform in dimension for the length of the nose is much preferred over a cross-section that varies in dimension with the depth of lapping that is performed. A curved upper surface to the nose, of course makes a consistent cross-section difficult to achieve. A flat top surface would thus have advantages in control of track width and ultimately in the track density that can be repeatably achieved during fabrication.

Thus, there is a great need for a write head having a flat top pole, which is thus easier to manufacture and which can be produced with more precise control, and for a method of manufacture which produces this type of write head having a flat top pole.

DISCLOSURE OF INVENTION

Accordingly, it is an object of the present invention to produce a write head with a controllable short nose to achieve high recording field for thin top-pole thicknesses, and thus a higher density recording.

Another object of the invention is to produce a write head which has the I2 insulation layer recessed farther from the ABS thus allowing the curvature of sloped portion of the P2 pole to be completed before the start of the flat nose portion. The nose portion is thus more nearly flat allowing for simplified processing steps in its manufacture.

And another object of the invention is to produce a write head in which the photolithography in a broad region around the ABS is be free of topographical reflections—thus enhancing the as-plated track width control.

A further object of the present invention is to produce a write head in which photolithography in a broad region around the ABS is free of topographical reflections thus allowing for straight plated side walls of the top-pole structure in the region from the ABS past the flare point (nose). This assures that there is no additional choke point between the designed flare point and the ABS.

An additional object of the present invention is to allow for a mushroomed yoke with mushroom recessed a large distance from the ABS. This implies the cavities under the mushroom will be buried a sufficient margin from the surface to preclude reliability problems associated with cracking and polymer exposure to air.

Yet another object of the present invention is to produce a write head which is uniform or nearly uniform in cross-sectional dimension, so that varying depth of lapping does not substantially affect track width.

Briefly, one preferred embodiment of the present invention is a disk drive write head having in consecutive layers a bottom pole, a write gap layer, a first insulation layer, a coil, a second insulation layer, having an insulation layer boundary, and a top pole on the second insulation layer. The top pole includes a main body portion and a nose portion and has a flare line at the location where the nose portion expands to become the main body portion. The top pole further includes a curved contour portion having a contour boundary, a tip which terminates in an air bearing surface, and a flat portion on the top surface of the nose extending between the tip and the contour boundary. The insulation layer boundary is recessed from the air bearing surface such that the top pole contour boundary lies substantially close to the flare line, thus producing a top pole top surface which is substantially flat.

Also disclosed is a method for fabricating the disk drive write head.

An advantage of the present invention is that critical dimensions are more easily controlled during the fabrication process with a flat nose portion.

Another advantage of the present invention is that the flat surface of the nose portion causes less scattering of light during the photolithography process.

And another advantage of the present invention is that the flare position is several microns from both the ABS and the insulation giving considerable manufacturing margin.

A further advantage of the present invention is that the side walls are substantially straight from flare position to ABS.

A yet further advantage is that due to the essentially consistent width of the write head nose portion, continued lapping of the write head to remove an additional micron of pole tip would not have a significant affect on ABS track width.

Yet another advantage of the present invention is that air pockets formed from mushrooming are formed farther away from the ABS and thus affect reliability of the head to a smaller degree.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
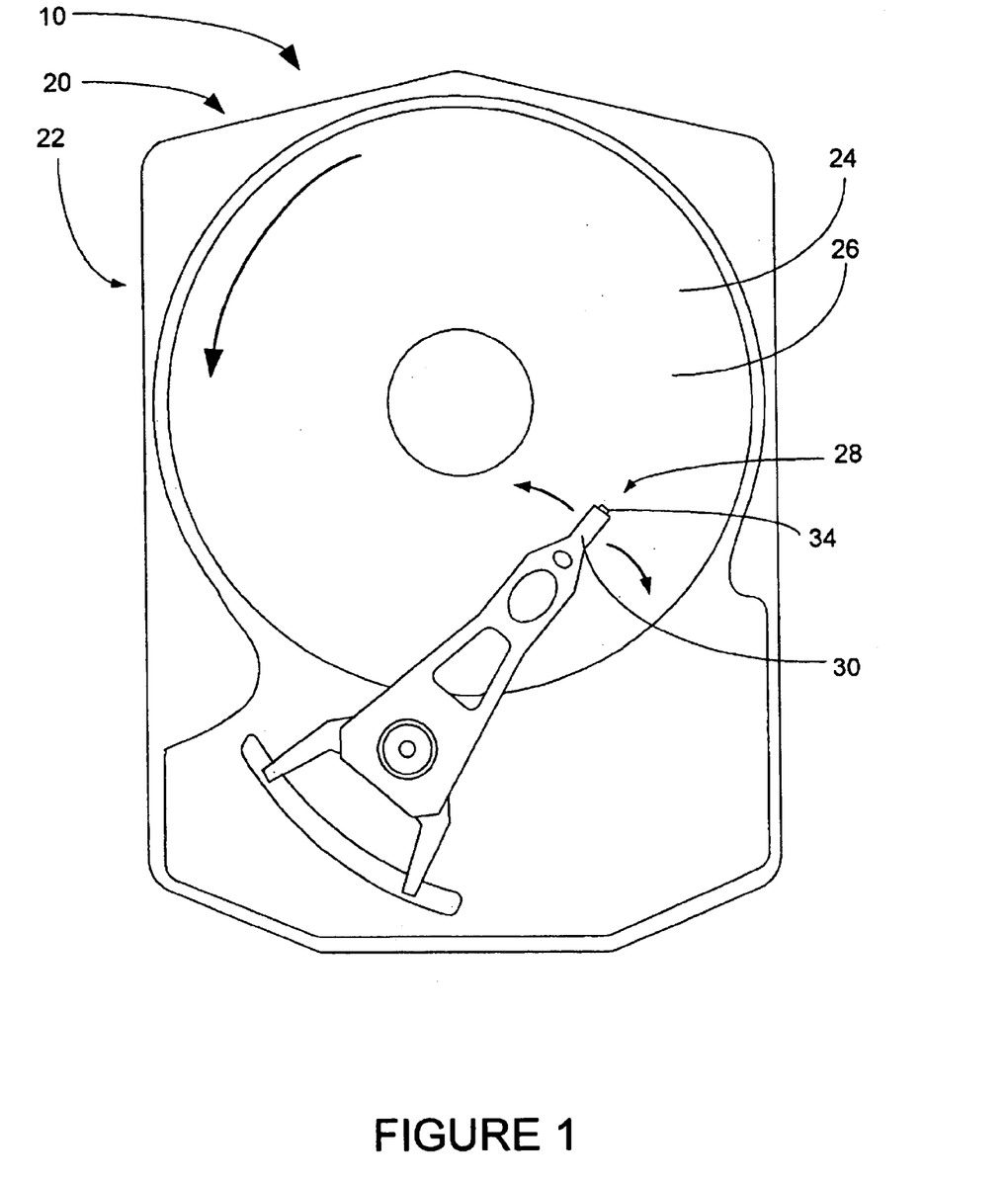
FIG. 1 shows a simplified top plan view of a disk drive.

FIG. 1 shows a simplified top plan view of a magnetic storage device 20, in this case a hard disk drive 22, which generally includes a magnetic storage medium 24, specifically a hard disk 26. A data read/write device 28 is included an arm 30, which supports a slider 34.

Figure 2:
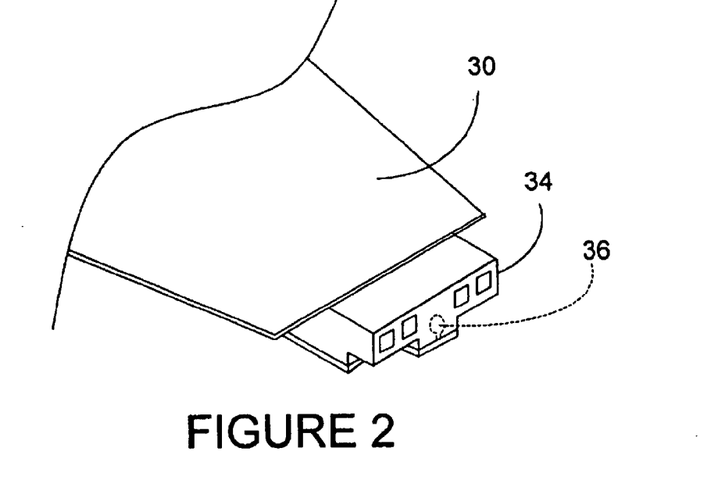
FIG. 2 shows an isometric detail view of the slider of a disk drive.

FIG. 2 illustrates a simplified isometric detail view of the arm 30 and slider 34 into which a magneto-resistive head 36 has been embedded.

FIG. 3 shows a top plan view of the components of the magneto-resistive head 36, including a coil 38, leads 40, a top pole piece 42, 70 having a pole tip 74. The surface facing the disk 26 (see FIG. 1) is supported by a layer of air which is established due to the rotation of the disk 26 under the slider 34, and which is known as the Air Bearing Surface or ABS 46. This ABS is covered with a protective coating 48.

FIGS. 4, and 5A–7B are cross-sectional views taken through line 4—4 in FIG. 3, which, are all turned to a horizontal orientation. FIG. 4, as discussed above, shows the typical elements of a magneto-restive read-write head. FIGS. 5A–B and 6A–B show two variations of the prior art which are compared to the present invention in FIGS. 7A–B. Certain elements are common to both the prior art and the present invention, and where these are similar, the same reference numbers will be used, in all figures. In this type of magneto-resistive head, both the read head and the write head are included on the same device, but it will be understood that the present invention is useful for devices in which the read head is separate from the write head.

The prior art, as seen in FIG. 4, will be described first. A typical prior art read/write head is shown in FIG. 4. Layers are generally deposited upon one another and typically include a shield layer 54, a dual gap layer 56, which surround a Magneto-resistive sensor, called MR sensor 58, a pole piece layer, which will be referred to as the bottom pole or P1 60, a non-magnetic gap layer 62, a first insulation layer or I1 64, upon which the coils 38 lie, and a second insulation layer, usually referred to as I2 66, which is generally made from photo-resist material. The bottom pole 60 may also include a pedestal 84. The top pole 42 is next, and is also commonly referred to as P2. The bottom and top poles 60, 42 each have bottom and top pole tips 72, 44 respectively with pole write gap 76 between them. The ABS 46 and the coating layer 48 are also shown, as well as a back gap 78. The top and bottom poles 42, 60 typically extend from the ABS 46 in a roughly parallel manner until the top pole 42 veers upward to accommodate the thickness of the coils 38 and insulation layers I1 64 and I2 66.

Also as described above, there are other features which are only apparent from a top or isometric view of the write head. As seen in FIG. 3, the top pole 42 has a main body portion 86 and a narrower portion, commonly referred to as a choke or nose 88. The narrow dimension of the top and bottom poles 42, 60 at the write gap 76 determine the track width and also serve to channel the magnetic flux to increase the flux density across the write gap 76. The point at which the nose begins to widen is known as the flare line 90. This is shown in prior art FIGS. 5B, 6B and 8A and B.

The write head is a complex shape in 3 dimensions which cannot be understood by only one view. As seen from the cross-sections 5A and 6A, axes are shown for the x and y directions as the z axis is normal to the plane of the paper in these views. In this view, the top pole P2 42 has a flat portion covering the main portion of the coils 38, which then begins to curve as the pole approaches the ABS 46 so that the distance between the top pole 42 and the bottom pole P1 60 narrows. This curved contour portion 92 has a contour boundary 94, at which point the top pole 42 optionally includes a flat portion 96 as it approaches the top pole tip 74. FIGS. 5A and B and 6A and B are corresponding cross-sectional and top plan views of two prior art write head architectures. FIGS. 5B and 6B are top plan views similar to FIG. 3 of the top pole P2 42, and includes axes x and z, the y axis being normal to the plane of the page. As the top pole curved contour 92 curves in the x and y dimensions (FIGS. 5A and 6A), the flare 90 widens in the x and z dimensions (FIGS. 5B and 6B). FIG. 8A shows an isometric view of the write head 42 with the three axes indicated for reference.

When the flare line 90 of the head lies within the contour boundary 94, then a portion of the pole nose 88 is also curved, or to put it another way, the contour boundary 94 lies closer to the ABS 46 than the flare point 90. Thus the flat portion 96 of the pole nose 88 is small as seen in FIG. 6B and 8A and B, or practically non-existent as in FIG. 5B.

Figure 7A:
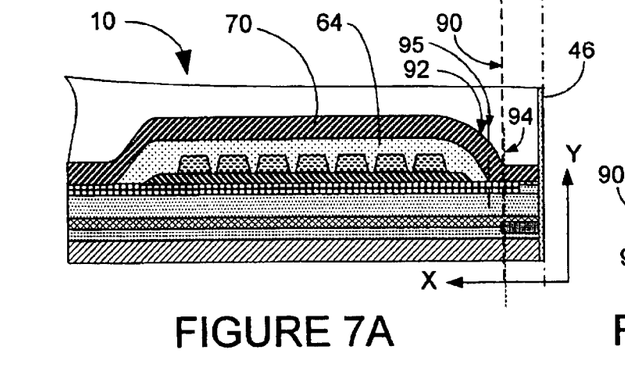
FIG. 7A illustrates a partial cross sectional view from line 4—4 of FIG. 3, which has been turned to a horizontal orientation, of a magneto-resistive read/write head of the present invention.
Figure 7B:
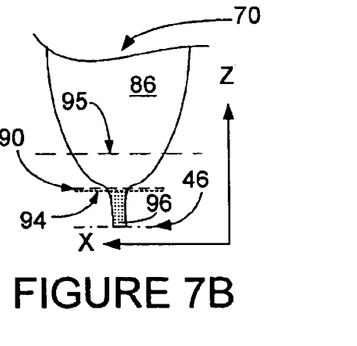
FIG. 7B shows a simplified partial top plan view of a top pole P2 of the present invention.
Figure 9A:
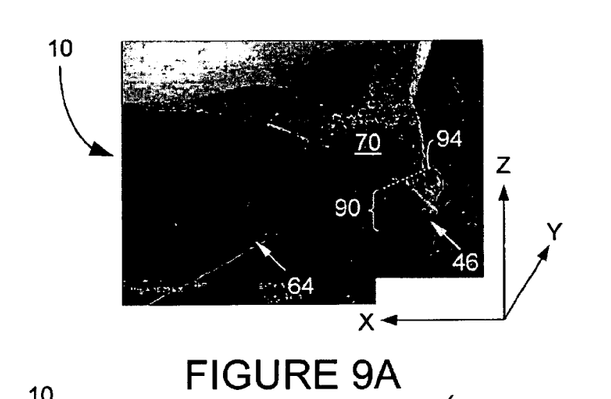
FIG. 9A shows a scanning electron microscope isometric view of the end portion of a write head of the present invention.
Figure 9B:
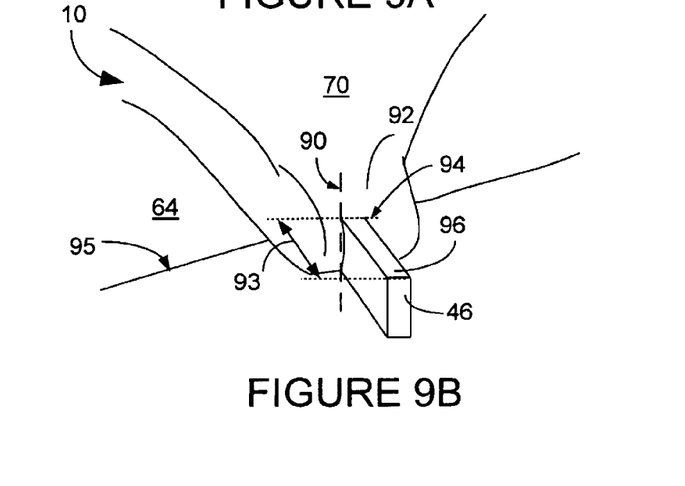
FIG. 9B is a simplified line drawing of the same end portion of a write head of the present invention.

In contrast, the write head with flat top nose 10 of the present invention is shown in FIGS. 7A–B and 9A–B, and the following discussion will refer to all four figures. FIG. 7A is a cross sectional view of the write head 10, FIG. 7B is a top plan view, FIG. 9A is a scanning electron microscope isometric view of the end portion of the write head 10 showing the top pole with the flat nose portion, which will be noted by the element number 70 and FIG. 9B is a simplified line drawings of the same end portion of a write head 10. The flare line 90 is assumed to be constant in position in FIGS. 5–7, as is the ABS 46.

"It can be seen that the I2 insulation 64 has been recessed, so that the I2 boundary 95 is further from the ABS 46 that those in the prior art, FIGS. 5A–B, 6A–B, and FIG. 8A–B. The recessed I2 boundary 64 thus allows the contour boundary 94 of the top pole 70 to also be recessed compared to the contour boundaries 94 of the top poles 42 of the prior art. The flat portion 96, shaded in FIGS. 5B through 9B is thus much expanded, with many accompanying benefits. The flat portion 96 preferably has a length and the flat portion 96 will be flat or substantially flat so that variation in height of the surface throughout this length preferably vary only 100–1000 angstroms ($1\times10^{-8}$ meters to $1\times10^{-7}$ meters). The insulation boundary 95 is recessed from the ABS 46, so that the top pole contour boundary 94 lies substantially close to the flare line 90, preferably within a range of $1–3\times10^{-6}$ meters."

There are several difficulties in manufacturing write heads such as the ones shown in FIGS. 5A–B, 6A–B and 8A and B. The performance of a write head in many ways is related to how close the flair position can be located to the air bearing surface. The closer it is, the more high performance media that can be written, and the smaller the track width that can be written. The problem is in manufacturing process is to control the structure and the position of the flare. It is much easier to control a structure when it is on a flat surface than it is on a curved surface, because this process typically involves photo-lithography. When light comes down onto a sloped surface, it tends to reflect and scatter out. In contrast, when light comes onto a flat surface, it has a tendency to reflect off the bottom and come back up rather than scattering out. This makes it easier to control the dimensions from a photo-lithography standpoint when the process is performed on a flat surface. Thus, the larger the portion of the pole nose 88 that is flat, as in the present invention 10, the greater control in manufacturing, the better the performance of the head and the greater the ease of manufacture there is.

Figure 10:
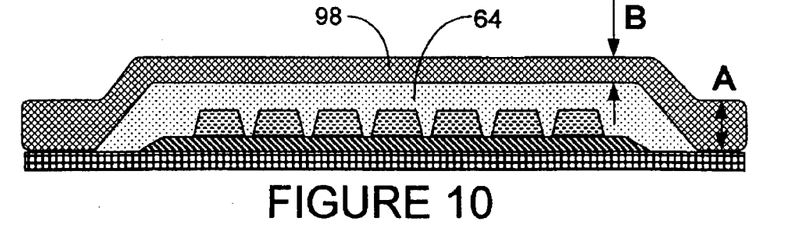
FIG. 10 shows a cross-section view of a write head which is prepared for plating.
Figure 11A:
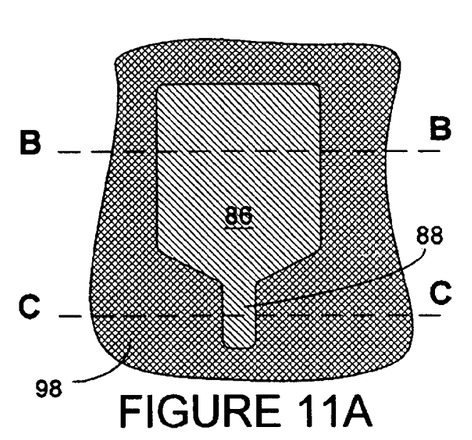
FIG. 11A is a top plan view of a top pole, which has been plated into a photo-resist matrix.
Figure 11B:
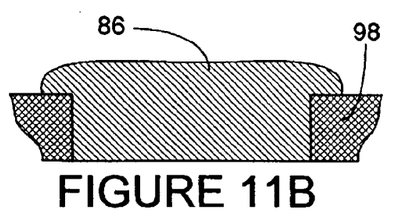
FIG. 11B is a cross-sectional view of a top pole, which has been plated into a photo-resist matrix, as taken through line B—B of FIG. 11A.
Figure 11C:
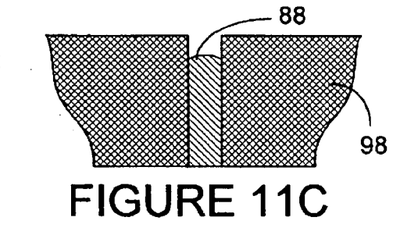
FIG. 11C is a cross-sectional view of a top pole, which has been plated into a photo-resist matrix, as taken through line C—C of FIG. 11A.

In addition, in the manufacturing process, air pockets or voids are often inadvertently created thanks to a process known as "mushrooming". This process is shown in FIGS. 10–13. In forming the top pole 42, the first step is to deposit photo-resist material 98 Which acts as a type of stencil for the pole plating (FIG. 10). It is desirable to make the photo-resist 98 as thin as possible because that allows the best control of the pattern (P2) that is printed print into it. However, the photo-resist has to be thicker than the height of the plated material. Being a fluid when first applied, the photo-resist 98 tends to well-up in the side regions, (shown at point A in FIG. 10) and thin out on the top (point B in FIG. 10). Thus the photo-resist hardens to be thick at the sides, one of which is where the nose will be formed, and is thin on the top portions. For example, if the thickness of the top pole plate is desired to be 4.5 microns, a layer of photoresist may be initially applied to be 4 microns and will finally, after settling, become 5 microns on the sides, but perhaps only be 3 microns at the top. When the plating layer is applied, the portion which will become the nose 88 (shown at cross-line C—C in FIG. 11A, and in cross-section at FIG. 11C) will be confined between the photo-resist walls 98, however, the wall height will not be enough in the center portions 88 such as at line B—B of FIG. 11A. The plating material will tend to overflow the walls and form a mushroom cross-sectional shape, as seen in FIG. 11B, which is the cross-sectional view seen from line B—B in FIG. 11A.

Figure 12:
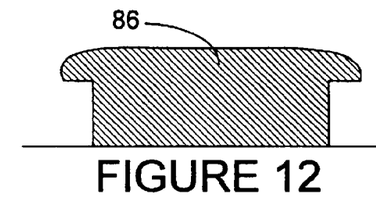
FIG. 12 is a cross-sectional view of a top pole, in which the photo-resist matrix has been removed.
Figure 13:
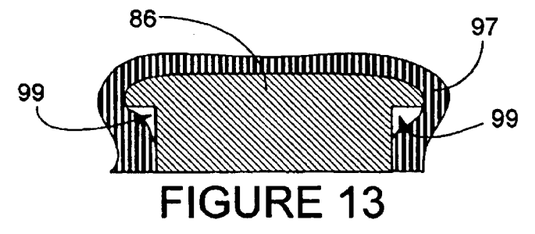
FIG. 13 is a cross-sectional view of a top pole which has been covered with an alumina coating, showing air pockets or voids which have been formed by shadowing as the coating was applied.

The photo-resist is then removed as in FIG. 12 and the pole portion 86 then covered in a sealant such as alumina 97, as seen in FIG. 13. In applying the alumina 97, there can be shadowing effects from the overhanging portions of the mushroom shape which leave air-pockets or voids 99. These air pockets 99 are a concern when they are formed very close to the air bearing surface ABS 46 (see FIG. 7A–B), as they can serve as sites for corrosion, if cracking allows moisture to seep into the voids, and can interfere with the operation of the write head. Thus it is desired that any air pockets which are formed are recessed from the ABS. A write head having the I2 insulation layer close to the ABS would be expected to have air pocket formations closer to the ABS than one in which the I2 boundary is recessed from the ABS. The thinning effect which leads to mushrooming tends to start at the point at which the slope changes, or in other words at the I2 boundary 95 (see FIG. 7A–B). If this I2 boundary 95 is recessed from the ABS 46, the area of mushrooming will also be recessed, and thus air pockets or voids 99 will necessarily be formed farther from the ABS as well. The write head performance and reliability will therefore be improved.

Another concern in fabrication of write heads occurs during the lapping process. The ABS is lapped, which involves removing a small amount of material from the tip of the nose. The track width that is written by the head depends on the width of the nose portion at the ABS. The depth of lapping can vary slightly due to minute variations in processing, and in the fabrication of the top pole. A variation in lapping depth will expose different cross-sections of the nose, so in order to maintain the track width as closely as possible, it is desired that cross-sections will yield the same dimensions as nearly as possible throughout the length of the nose portion or at least the front part of the nose which may be involved in the lapping process. Thus a rectangular cross-section which is uniform in dimension for the length of the nose is much preferred over a cross-section that varies in dimension with the depth of lapping that is performed. A curved upper surface to the nose, of course makes a consistent cross-section difficult to achieve.

A further advantage of the present invention is that straight walls of uniform cross-section are more easily produced, again due to the enhanced process control available when dealing with a flat surface. A flat top surface such as in the present invention would thus have advantages in control of track width and ultimately in greater track density that can be repeatably achieved during fabrication.

While various embodiments have been described above, it should be understood that they have been presented by way of example only, and not limitation.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A disk drive write head comprising:
   a bottom pole;
   a write gap layer on said bottom pole;
   a first insulation layer on said write gap layer;
   a coil on said first insulation layer;
   a second insulation layer having an insulation layer boundary;
   a top pole on said second insulation layer, said top pole including a main body portion and a nose portion and a flare line at the point where the nose portion expands to become the main body portion, said top pole further including a curved contour portion having a contour boundary, a tip which terminates in an air bearing surface, and a flat portion on the top surface of said nose extending between said tip and said contour boundary; and
   said insulation layer boundary being recessed from said air bearing surface such that said top pole contour boundary lies within a range of $1 \times 10^{-6}$ meters to $3 \times 10^{-6}$ meters of said flare line.

2. The disk drive write head of claim 1, where:
   said flat portion has a length which lies within a range of $3 \times 10^{-6}$ meters to $6 \times 10^{-6}$ meters.

3. The disk drive write head of claim 2, wherein:
   variation in height of the flat portion throughout said length lies in the range of 100–1000 angstroms($1 \times 10^{-8}$ meters to $1 \times 10^{-7}$ meters).

4. The disk drive writes head of claim 1, wherein:
   said write head also includes a read head.

5. The disk drive write head of claim 1, wherein:
   said bottom pole includes a pedestal.

6. A disk drive write head comprising:
   a bottom pole;
   a write gap layer on said bottom pole;
   a first insulation layer on said write gap layer;
   a coil on said first insulation layer;
   a second insulation layer, having an insulation layer boundary;
   a top pole on said second insulation layer, said top pole including a main body portion and a nose portion and a flare line at the point where the nose portion expands to become the main body portion, said top pole further including a curved contour portion having a contour boundary, a tip which terminates in an air bearing surface, and a flat portion on the top surface of said nose extending between said tip and said contour boundary, said flat portion having a length which lies within a range of $3 \times 10^{-6}$ meters to $6 \times 10^{-6}$ meters; and
   variation in height of the surface of said flat portion throughout said length lies in the range of 100–1000 angstroms ($1 \times 10^{-8}$ meters to $1 \times 10^{-7}$ meters).

7. The disk drive head of claim 6, wherein:
   said insulation layer boundary is recessed from said air bearing surface such that said top pole contour boundary lies within a range of $1 \times 1^{-6}$ meter to $3 \times 10^{-6}$ meters of said flare line.

8. A slider for writing data to a disk surface, said slider including a magneto-resistive write head said head comprising:
   a bottom pole;
   a write gap layer on said bottom pole;
   a first insulation layer on said write gap layer;
   a coil on said first insulation layer;
   a second insulation layer, having an insulation layer boundary;
   a top pole of said second insulation layer, said top pole including a main body portion and a nose portion and a flare line at the point where the nose portion expands to become the main body portion, said top pole further including a curved contour portion having a contour boundary, a tip which terminates in an air bearing surface, and a flat portion on the top surface of said nose extending between said tip and said contour boundary; and
   said insulation layer boundary being recessed from said air bearing surface such that said top pole contour boundary lies within a range of $1 \times 10^{-6}$ meters to $3 \times 10^{-6}$ meters of said flare line.

9. The slider of claim 8, wherein:
   said flat portion has a length which lies within a range of $3 \times 10^{-6}$ meters to $6 \times 10^{-6}$ meters.

10. The slider of claim 9, wherein:
    variation in height of the surface of the flat portion throughout said length varies in the range of 100–1000 angstroms ($1 \times 10^{-8}$ meters to $1 \times 10^{-7}$ meters).

11. The slider of claim 8, wherein:
    said write head also includes a read head.

12. The slider of claim 8, wherein:
    said bottom pole includes a pedestal.

13. A computer disk drive having a slider for reading data from a disk surface, said slider including a magneto-resistive head, said head comprising:
    a bottom pole;
    a write gap layer on said bottom pole;
    a first insulation layer on said write gap layer;
    a coil on said first insulation layer;
    a second insulation layer, having an insulation layer boundary;
    a top pole on said second insulation layer, said top pole including a main body portion and a nose portion and a flare line at the point where the nose portion expands to become the main body portion, said top pole further including a curved contour portion having a contour boundary, a tip which terminates in an air bearing surface, and a flat portion on the top surface of said nose extending between said tip and said contour boundary; and
    said insulation layer boundary being recessed from said air bearing surface such that said top pole contour boundary lies within a range of $1 \times 10^{-6}$ meters to $3 \times 10^{-6}$ meters of said flare line.

14. The computer disk drive of claim 13, wherein:

said flat portion has a length which lies within a range of $3 \times 10^{-6}$ meters to $6 \times 10^{-6}$ meters.

15. The computer disk drive of claim 14, wherein:

variation in height of the surface of said flat portion throughout said length lies in the range of 100–1000 angstroms ($1 \times 10^{-8}$ meters to $1 \times 10^{-7}$ meters).

16. The computer disk drive of claim 13, wherein:

said write head also includes a read head.

17. The computer disk drive of claim 13 wherein:

said bottom pole includes a pedestal.

18. A method of fabricating a disk drive write head comprising the step of:

a. forming a bottom pole;

b. forming a write gap layer on said bottom pole;

c. forming a first insulation layer on said write gap layer;

d. forming a coil on said first insulation layer;

e. forming a second insulation layer, having an insulation layer boundary; and    f. forming a top pole on said second insulation layer, said top pole including a main body portion and a nose portion and a flare line at the point where the nose portion expands to become the main body, portion said top pole further including a curved contour portion having a contour boundary, a tip which terminates in an air bearing surface, and a flat portion on the top surface of said nose extending between said tip and said contour boundary, said insulation layer boundary being formed recessed from said air bearing surface such that said top pole contour boundary lies within a range of $1 \times 10^{-6}$ meters to $3 \times 10^{-6}$ meters of said flare line.

19. The method of fabrication of claim 18, wherein:

said write head also includes a read head.

20. The method of fabrication of claim 18, wherein:

said bottom pole includes a pedestal.

\* \* \* \* \*